(12) United States Patent
Nishiuma et al.

(10) Patent No.: US 9,074,905 B2
(45) Date of Patent: Jul. 7, 2015

(54) ROUTE SEARCH DEVICE

(75) Inventors: Norihiro Nishiuma, Tokyo (JP);
Masahiko Ikawa, Tokyo (JP); Yasuhiro Nishikawa, Tokyo (JP); Ryusuke Kinoshita, Tokyo (JP); Takashi Irie, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/521,071

(22) PCT Filed: Mar. 8, 2010

(86) PCT No.: PCT/JP2010/053748
§ 371 (c)(1),
(2), (4) Date: Jul. 9, 2012

(87) PCT Pub. No.: WO2011/111145
PCT Pub. Date: Sep. 15, 2011

(65) Prior Publication Data
US 2013/0006530 A1    Jan. 3, 2013

(51) Int. Cl.
*G01C 21/34* (2006.01)
*G08G 1/123* (2006.01)

(52) U.S. Cl.
CPC .................. *G01C 21/3469* (2013.01)

(58) Field of Classification Search
CPC ...................................... G01C 21/34
USPC ........ 701/200, 532, 533; 705/7, 11, 330, 400, 705/417
See application file for complete search history.

(56) References Cited

U.S. PATENT DOCUMENTS 5,168,452 A    12/1992   Yamada et al.
5,742,922 A *   4/1998   Kim .............................. 701/423
5,845,228 A    12/1998   Uekawa et al.
(Continued)

FOREIGN PATENT DOCUMENTS

CN    101413805 A    4/2009
DE    196 05 458 C1   9/1997
(Continued)

OTHER PUBLICATIONS

International Preliminary Report on Patentability and Written Opinion issued Sep. 20, 2012 in Application No. PCT/JP2010/053748.
(Continued)

*Primary Examiner* — Fadey Jabr
*Assistant Examiner* — Martin Weeks
(74) *Attorney, Agent, or Firm* — Oblon, McClelland, Maier & Neustadt, L.L.P.

(57) ABSTRACT

A route search device capable of searching for a route with the lowest energy cost at a high speed even if the distance between start and end points is long. The route search device includes: a long distance search attribute calculation section for calculating, as an attribute of one long distance search link, the sum of upslope elevation differences of a plurality of short distance search links and the sum of downslope elevation differences of the short distance search links corresponding to the one long distance search link; and a link cost calculation section for calculating, based on the attribute of the long distance search link and vehicle characteristics, a link cost that is an energy consumption at a time when a vehicle travels in the long distance search link.

12 Claims, 4 Drawing Sheets

(56) References Cited

U.S. PATENT DOCUMENTS

| | | | |
|---|---|---|---|
| 7,493,209 B1 | 2/2009 | Altrichter et al. | |
| 8,175,795 B2 | 5/2012 | Narita et al. | |
| 2009/0082952 A1* | 3/2009 | Narita et al. | 701/202 |
| 2009/0082967 A1* | 3/2009 | Hara et al. | 701/225 |
| 2009/0112463 A1* | 4/2009 | Yamane et al. | 701/209 |
| 2010/0049397 A1 | 2/2010 | Liu et al. | |
| 2010/0114470 A1 | 5/2010 | Nambata | |
| 2010/0114473 A1* | 5/2010 | Kono et al. | 701/200 |
| 2010/0185384 A1* | 7/2010 | Naito et al. | 701/200 |

FOREIGN PATENT DOCUMENTS

| | | |
|---|---|---|
| DE | 103 18 615 A1 | 11/2003 |
| DE | 10 2008 037 379 A1 | 4/2009 |
| JP | 2653847 B2 | 9/1997 |
| JP | 10-38594 A | 2/1998 |
| JP | 3223782 B2 | 10/2001 |
| JP | 2004-28896 | 1/2004 |
| JP | 2008-107155 | 5/2008 |
| JP | 2009-79995 | 4/2009 |
| JP | 2009-198293 | 9/2009 |
| WO | WO 2006/126343 A1 | 11/2006 |
| WO | WO 2008/044281 A1 | 4/2008 |

OTHER PUBLICATIONS

International Search Report issued May 25, 2010 in Application No. PCT/JP2010/053748.

Chinese Office Action issued on Aug. 8, 2014 in corresponding Chinese Application No. 201080062970.4, with English translation, citing document AO therein (19 pages).

Office Action issued Jan. 14, 2015 in German Patent Application No. 11 2010 005 366.9 (with English language translation).

Combined Office Action and Search Report issued Jan. 28, 2015 in Chinese Patent Application No. 201080062970.4 (with partial English language translation).

* cited by examiner

F I G. 4

ENERGY CONSUMPTION PER ONE LINK (LINK COST)
= C_1*q_base*T + C_2*μMg*D
+ C_3*Mg*H_up + C_4*Mg*H_down
+ C_5*κ*v³*T + C_6*(M+m)/2*v²*N_stop

PARAMETER RELATING TO VEHICLE q_base : BASIC CONSUMPTION PER UNIT TIME
μ : COEFFICIENT OF FRICTION WITH ROAD SURFACE
κ : COEFFICIENT OF AIR RESISTANCE
M : WEIGHT OF VEHICLE
m : INERTIA
C_1~C_6 : COEFFICIENT CONCERNING VEHICLE EFFICIENCY

PARAMETER RELATING TO ROAD

T : TRAVELING TIME
D : DISTANCE
v : TRAVELING SPEED (=D/T)
H_up (down) : THE SUM OF ELEVATION DIFFERENCES
N_stop : THE NUMBER OF STOPS

ROUTE SEARCH DEVICE

TECHNICAL FIELD

The present invention relates to a route search device, and particularly to a route search device for use in a car navigation system, or the like, capable of searching for a route with the lowest energy cost (such as a carbon dioxide emission, a fuel consumption, and a power consumption) required for traveling from a start point (for example, a departure place) to an end point (for example, a destination place).

BACKGROUND ART

Among conventional route search devices capable of searching for a route with the lowest carbon dioxide emission, there is a route search device in which a carbon dioxide emission that varies in accordance with a distance of each section (hereinafter, referred to as a link) is identified by calculating a coefficient in accordance with a road gradient state of the section based on a difference in height between both ends of the section stored in a storage medium and then multiplying a distance of each section by the coefficient, and additionally a carbon dioxide emission that varies in accordance with a traveling time of each section and a carbon dioxide emission based on an index that varies in accordance with the number of stops in each section are separately identified, and moreover the respective carbon dioxide emissions thus identified are summed so that a carbon dioxide emission of each section is calculated (Patent Document 1).

In the route search device of the Patent Document 1, a difference in height of each link is obtained by using a difference in height between a start point and an end point of the link (see paragraph [0052]), and a gradient of the link is expressed by using a relationship of "$\sin° =$the difference in height (between both ends of the link)/distance (of the link)" ($\theta$: the angle formed between a horizontal plane and the link) (see paragraph [0048]). Thereby, a fuel consumption concerning position energy caused by the difference in height between both ends of the link is obtained. Although the gradient $\theta$ is explained in the description of paragraph [0048], the fuel consumption is eventually calculated based on position energy (mg×the difference in height (between both ends of the link)) caused by the difference in height between both ends of the link. Therefore, an influence of the degree of the gradient, such as a gentle upslope or a steep upslope, is not considered. Accordingly, this technique presupposes a link in which the gradient is constant (the gradient does not vary depending on a location in the link) and a fuel consumption concerning position energy of the link.

On the other hand, in a route search device of a car navigation system or the like, such a technique is disclosed that not only a low-level road network having a large amount of information (having detailed information) but also a high-level road network having a small amount of information (abstracted) is held in map data so that an increase in a calculation time required for a route search and in a memory capacity is suppressed even in a case where a distance from a departure place to a destination place is long (for example see Patent Document 2).

PRIOR-ART DOCUMENTS

Patent Documents

Patent Document 1: Japanese Patent Application Laid-Open No. 2009-79995
Patent Document 2: Japanese Patent No. 3223782

SUMMARY OF THE INVENTION

Problems to be Solved by the Invention

Normally, in the route search technique using a high-level road network as disclosed in the Patent Document 2, a route search in the high-level road network is performed based on an attribute and a link cost that are set in a link (hereinafter, referred to as a long distance search link) of the high-level road network having an aggregation of a plurality of links (hereinafter, referred to as short distance search links) of a low-level road network. Generally, even when the gradient of a short distance search link is constant, a long distance search link having an aggregation of a plurality of the short distance search links has a section with an upslope or downslope gradient (that is, a short distance search link having an upslope gradient or a short distance search link having a downslope gradient) and therefore the gradient of the long distance search link is not necessarily constant. For example, in some case, although a difference in height between both ends of a long distance search link is zero, an upslope gradient section and a downslope gradient section repeatedly exist in the long distance search link.

Here, an application of the route search device disclosed in the Patent Document 1 to the above-described route search technique in which a road network is divided into a plurality of levels involves an problem that, with respect to a long distance search link in which the gradient is not necessarily constant, an influence of upslopes and downslopes existing in the link on position energy cannot be considered because a carbon dioxide emission that corresponds to the link cost is identified based on the difference in height between both ends of the link, which makes it impossible to calculate a link cost that accurately reflects an influence of position energy in traveling. For example, in a case where a difference in height between both ends of a long distance search link is zero while upslope and downslope gradient sections repeatedly exist in the link, it is necessary to calculate such a link cost that reflects an influence of position energy in the upslopes, but if only the difference in height between both ends of the link is considered, it is determined that the position energy in the upslopes is zero.

Additionally, in a case where the route search device disclosed in the Patent Document 1 is not applied to the above-described route search technique in which a road network is divided into a plurality of levels, there is a problem that a route search requires time if the distance between a start point and an end point is long.

The present invention is made to solve the above-described problems, and an object of the present invention is to provide a route search device capable of, in a route search using a high-level road network, performing the search in consideration of a factor, such as a gradient in a link, that influences an energy cost, and capable of searching for a route with the lowest energy cost at a high speed even if the distance between start and end points is long.

Means for Solving the Problems

To solve the above-described problems, a route search device according to the present invention is a route search device for searching for a route that connects a start point to an end point, the route search device including: a map data section including short distance search road data that contains a short distance search link for use in a short distance search and long distance search road data that contains a long distance search link for use in a long distance search; a long distance search attribute calculation section for calculating, as an attribute of one long distance search link, the sum of upslope elevation differences of a plurality of short distance search links and the sum of downslope elevation differences of the plurality of short distance search links corresponding to the one long distance search link; a link cost calculation section for calculating a link cost that is an energy consumption at a time when a vehicle travels in the long distance search link, based on the attribute of the long distance search link and vehicle characteristics; and a route search processing section for performing, based on the link cost, a process of obtaining such a route that the energy consumption is the lowest, or a process of calculating the energy consumption in a predetermined route.

Effects of the Invention

The present invention includes: the long distance search attribute calculation section for calculating, as the attribute of the one long distance search link, the sum of upslope elevation differences and the sum of downslope elevation differences of a plurality of short distance search links corresponding to one long distance search link; the link cost calculation section for calculating the link cost that is the energy consumption at a time of a vehicle travels in the long distance search link, based on the attribute of the long distance search link and the vehicle characteristics; and the route search processing section for performing, based on the link cost, the process of obtaining such a route that the energy consumption is the lowest or the process of calculating the energy consumption in a predetermined route. Accordingly, in a route search using a high-level road network, the search can be performed in consideration of a factor, such as the gradient in a link, that influences the energy cost, and a route with the lowest energy cost can be searched for at a high speed even if the distance between start and end points is long.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 A diagram showing an example of calculation of a link cost of the long distance search link according to the embodiment of the present invention.

EMBODIMENT FOR CARRYING OUT THE INVENTION

In the following, an embodiment of the present invention will be described with reference to the drawings.

Figure 1:
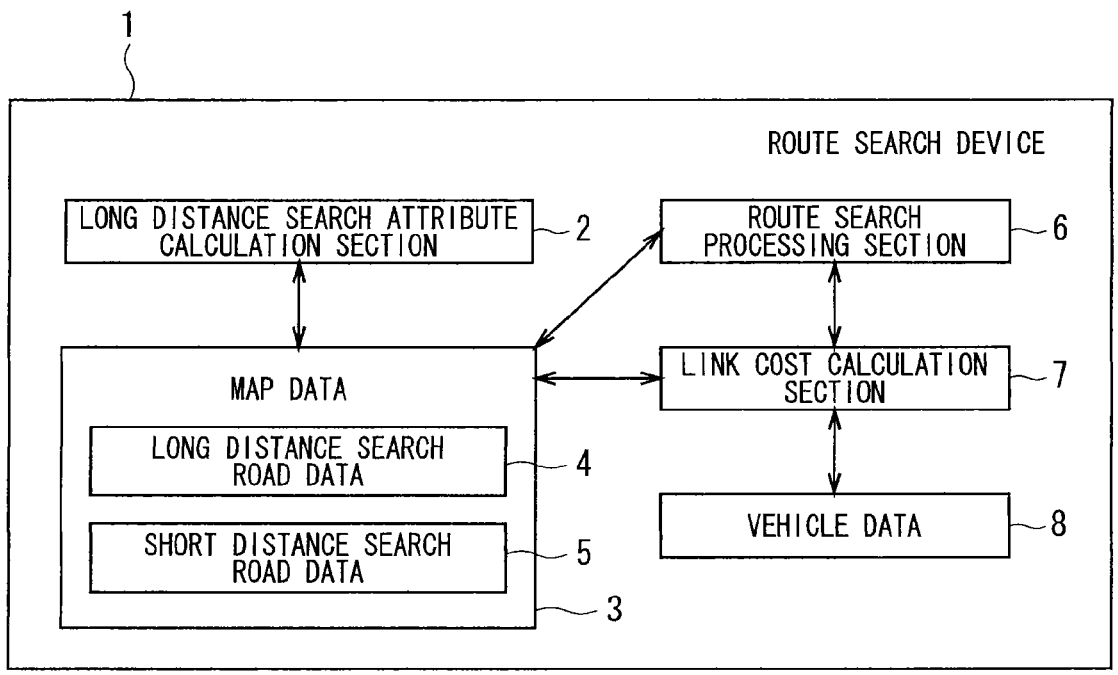
FIG. 1 A block diagram showing a configuration of a route search device according to an embodiment of the present invention.

FIG. 1 is a block diagram showing a configuration of a route search device 1 according to an embodiment of the present invention. As shown in FIG. 1, the route search device 1 according to this embodiment searches for a route connecting a start point to an end point, and includes a long distance search attribute calculation section 2, map data 3 (map data section), a route search processing section 6, a link cost calculation section 7, and vehicle data 8. The map data 3 includes short distance search road data 5 that contains a short distance search link for use in a short distance search, and long distance search road data 4 that contains a long distance search link for use in a long distance search.

In the description given above, to facilitate the description, a case where the gradient of a short distance search link is constant is assumed. Actually, however, the gradient of a short distance search link may change within the link. That is, one short distance search link may include a plurality of upslope sections (road sections having positive gradients) and a plurality of downslope sections (road sections having negative gradients). Such a case and the case of a constant gradient mentioned above are put together and generalized. Thus, the sum of upslope elevation differences of a short distance search link represents the sum of elevation differences of upslope road sections in a road section corresponding to the short distance search link, and the sum of downslope elevation differences of a short distance search link represents the sum of elevation differences of downslope road sections in a road section corresponding to the short distance search link. If the link is divided at a spot where the gradient changes, the generalization described herein (for eliminating restrictions concerning the gradient of the short distance search link) is not necessary. However, for example, in a case where there are a large number of gradient changing points but there is no branch point (point connecting to another link) in the link, this generalization is useful because dividing the link at each gradient changing point increases the size of map data (road data).

The long distance search attribute calculation section 2 uses attributes of a plurality of short distance search links corresponding to a long distance search link to thereby calculate an attribute of the long distance search link necessary for a route search using the long distance search link, and stores the attribute in the long distance search road data 4 of the map data 3.

A process in the long distance search attribute calculation section 2 may be preliminarily performed in the step of preparing the map data 3 to be stored in a hard disk of a car navigation system, or may be dynamically performed in the car navigation system. For example, it may be possible that, upon update of the map data 3, only short distance search link attribute information is obtained from the outside via communication or the like, and the long distance search attribute calculation section 2 provided in the car navigation system calculates and updates an attribute of a long distance search link by using the obtained short distance search link attribute information. This can reduce the amount of data to be obtained for updating. In the above-described example, it is assumed that the long distance search attribute calculation section 2 is provided in the car navigation system. However, in a case where the long distance search attribute calculation section 2 is provided in a map generation system, the same effects can also be obtained.

The long distance search road data 4 and the short distance search road data 5 include node data concerning a node that corresponds to an intersection or the like, and link data concerning a road section (link) between nodes. The road data holds information about connection between nodes, and allows calculation of a route that minimizes a cost (link cost) between two designated points by using a search algorithm such as the Dijkstra method. As the connection information, for example, a node number that uniquely identifies a node may be stored in the node data, and the node numbers of a start point and an end point of a link may be stored in the link data. Hereinafter, a description will be given to a route search while focusing the link cost necessary for passing through each link. However, in a case where a cost for passing a node is different between going straight and turning right or left, a node cost necessary for passing the node may be set.

As for the link cost of a link, when the length of the link is defined as the link cost, the route search can be performed with priority to distance, while when time required for passing through the link is defined as the link cost, the route search can be performed with priority to time. When the amount of energy consumed for passing through the link is defined as the link cost, the route search with the lowest energy cost can be performed.

The link data holds attributes necessary for calculating the link cost, such as the length of a link, a road type, the number of lanes, a traveling speed, a regulatory speed, the shape, an elevation difference, and the like.

Short distance search links that are not used for a long distance search are removed from a low-level road network (for example, only main roads such as an expressway are left), and thereby the long distance search road data 4 is separately defined so as to constitute a high-level road network. Additionally, nodes having no branch (that is, having two links connected thereto) are omitted, and thereby the number of links and the number of nodes in the high-level road network are reduced. Thus, the long distance search link is defined.

The high-level road network may be configured with only main roads such as an expressway being left by using the road type or the like, or may be configured with a minimum necessary road network obtained by performing a route search in the low-level road network by using various combinations of start and end points (for example, Japanese Patent No. 2653847) or various combinations of link costs (combinations of link costs depending on a search option such as time priority, distance priority, and energy cost priority). Although this embodiment describes a case where there are two levels in total, namely, one level of the low-level road network and one level of the high-level road network, a road network having three or more levels in total may be used in accordance with the size of a road network and a desired processing speed, as long as the long distance search link that is at a higher level includes a plurality of short distance search links that are at a lower level than the long distance search link.

The route search processing section 6 reads the road data included in a route search range from the long distance search road data 4 or the short distance search road data 5 of the map data 3, and obtains a route in which the sum of link costs calculated by the link cost calculation section 7 is the lowest, and outputs the route to a monitor (not shown) or the like. That is, based on the link cost calculated by the link cost calculation section 7, the route search processing section 6 performs a process for obtaining a route with the lowest energy consumption, or a process for calculating an energy consumption in a predetermined route (for example, a route having the shortest travel distance, or a route having the shortest traveling time).

The link cost calculation section 7 calculates the link cost by using the attribute obtained from the long distance search road data 4 or the short distance search road data 5 of the map data 3, vehicle characteristics obtained from the vehicle data 8, and the like, and then outputs the calculated link cost to the route search processing section 6.

Figure 2:
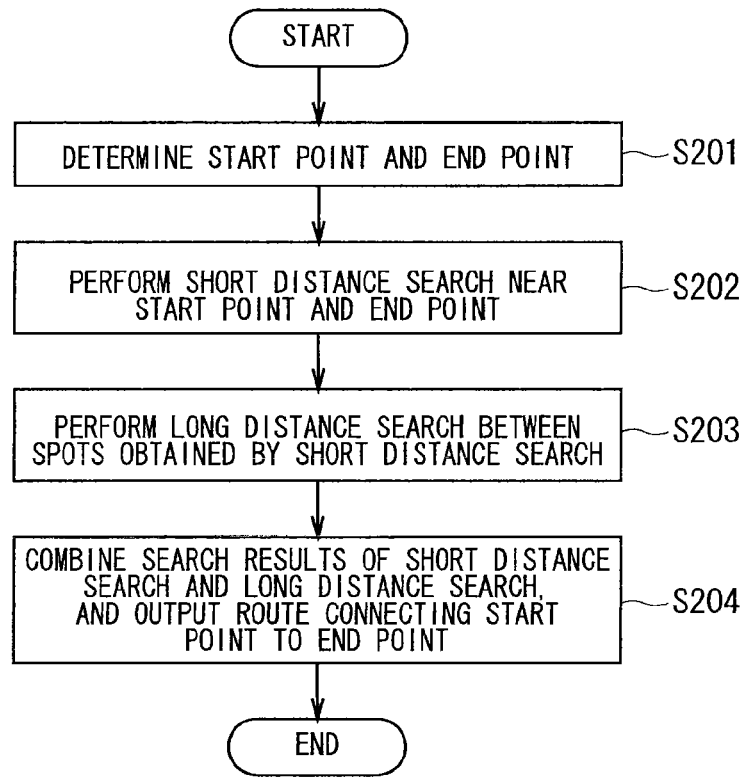
FIG. 2 A flowchart showing an operation of the route search device according to the embodiment of the present invention.

FIG. 2 is a flowchart showing an operation of the route search device 1 according to the embodiment of the present invention, and is a flowchart showing an operation of the route search processing section 6 at a time of performing a route search by using the high-level road network in a case where the distance from a start point (current location) to an end point (destination place or stopover place) is long.

As shown in FIG. 2, in step S201, the route search processing section 6 determines two points, namely, a start point and an end point, on the low-level road network in which the route search is to be performed, by using information of the current location and the destination place (stopover place) set by the user.

In step S202, necessary road data on the low-level road network near each of the start point and the end point determined in step S201 is read from the short distance search road data 5 of the map data 3, and a route search is performed from each of the start point and the end point while obtaining the link cost necessary for the route search from the link cost calculation section 7. Thus, a spot that allows a shift to the high-level road network is determined (short distance search). There may be a plurality of candidates for the spot that allows a shift to the high-level road network.

In step S203, necessary road data on the high-level road network, between the spots obtained by the short distance search in step S202, is read from the long distance search road data 4 of the map data 3, and a search for a route between the spots is performed while obtaining the link cost necessary for the route search from the link cost calculation section 7. Thus, such a route that the sum of the link costs between the spots is the lowest is calculated (long distance search).

In step S204, search results of the short distance search performed in step S202 and the long distance search performed in step S203 are combined with each other. Then, such a route that the sum of the link costs from the start point to the end point is the lowest is determined and outputted.

Additionally, by using the low-level road network, based on the node (link) data of the low-level road network corresponding to the search result (a group of passing nodes (links)) in the high-level road network, a right/left turn guidance at an intersection, or the like, may be associated with the high-level road network.

Figure 3:
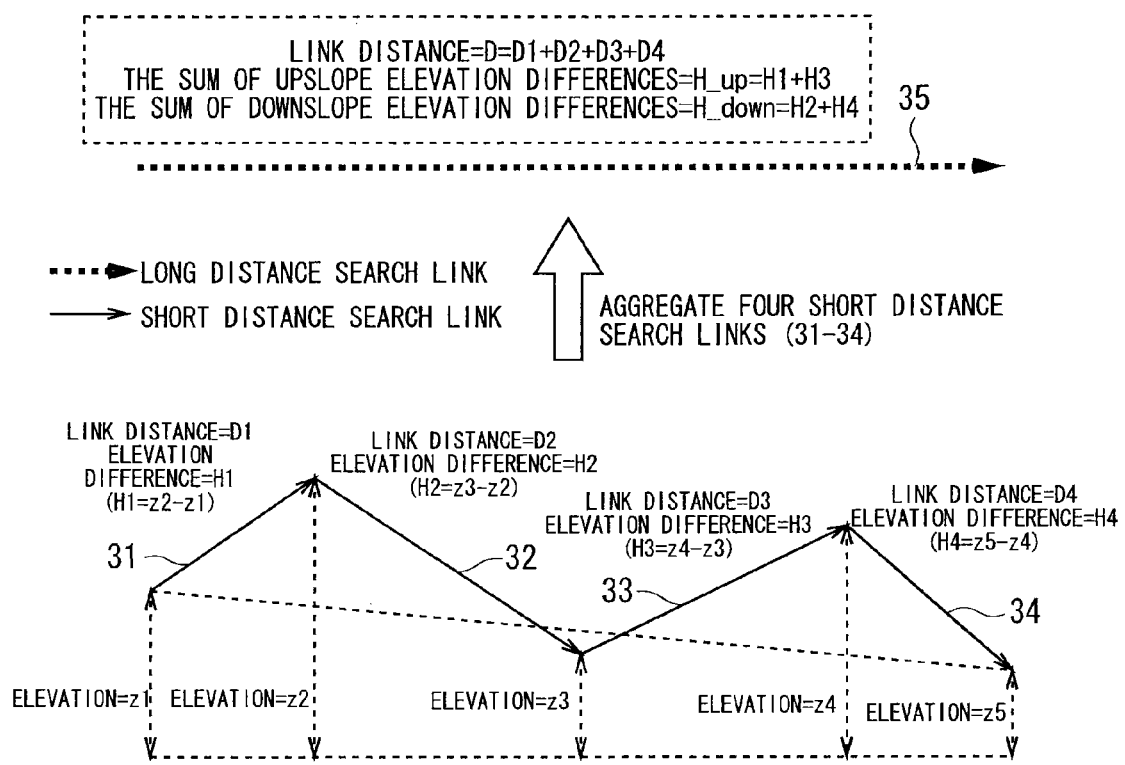
FIG. 3 A conceptual diagram for explaining setting of attributes concerning a distance and an elevation of a long distance search link according to the embodiment of the present invention.

FIG. 3 is a conceptual diagram for explaining the setting of the attributes concerning the distance and the elevation of the long distance search link according to the embodiment of the present invention. FIG. 3 shows, as an example, a case where four short distance search links (two short distance search links 31 and 33 having upslope sections and two short distance search links 32 and 34 having downslope sections) are aggregated into one long distance search link 35. Here, for simplification, a case where the gradient of the short distance search link is constant is shown.

As shown in FIG. 3, the sum (H1+H3) of upslope elevation differences of the short distance search links 31 and 33 and the sum (H2+H4) of downslope elevation differences of the short distance search links 32 and 34 are set as attributes (H_up, H_down) of the long distance search road data 4 of the long distance search link 35 that corresponds to the short distance search links 31 to 34. That is, with respect to a plurality of short distance search links corresponding to one long distance search link, the long distance search attribute calculation section 2 calculates, as the attributes of the one long distance search link, the sum of upslope elevation differences of the short distance search links and the sum of downslope elevation differences of the short distance search links. Alternatively, the long distance search attribute calculation section 2 may calculate the sum of elevation differences only if the sum of elevation differences to be calculated will be equal to or more than a certain threshold value. This makes it possible to, when storing the sum of elevation differences in the map data, omit information of an elevation difference that gives a small influence to the energy consumption. Thus, the volume of the map data can be reduced.

Moreover, the sum (D1+D2+D3+D4) of the distances of the short distance search links 31 to 34 is also set as an attribute (D) of the long distance search road data 4 of the long distance search link 35. Thus, the attributes of the long distance search link calculated by the long distance search attribute calculation section 2 are held in the long distance search road data 4.

As for attributes of the long distance search road data 4 such as a traveling time, the number of stops, and the like, in the long distance search link 35, similarly to the above-described manner, the sum of traveling times, the total number of stops, and the like, in the respective short distance search links 31 to 34 may be set as the attributes of the long distance search road data 4. That is, the long distance search attribute calculation section 2 calculates, as attributes of one long distance search link, the sum of traveling times, the sum of distances, the sum of upslope elevation differences, the sum of downslope elevation differences, and the total number of stops in a plurality of short distance search links corresponding to the one long distance search link. Then, in accordance with a request from the route search processing section 6, the link cost calculation section 7 calculates the link cost based on the attributes of the long distance search link and the vehicle characteristics.

The link distance (D1 to D4) and the elevation difference (H1 to H4) of each of the short distance search links 31 to 34 are set, as attributes of each of the short distance search links 31 to 34, in the short distance search road data 5 of the map data 3.

FIG. 4 is a diagram showing an example of calculation of the link cost of the long distance search link according to the embodiment of the present invention. As shown in FIG. 4, the calculation is performed while the energy consumption (link cost) per one link is divided into: a basic consumption ($C\_1*q\_base*T$) relating to an energy necessary for something other than traveling, due to idling, an operation of an air conditioner, and the like; a consumption ($C\_2*\mu Mg*D$) due to friction of a road surface; a consumption ($C\_3*Mg*H\_up$ (upslope)+$C\_4*Mg*H\_dowm$ (downslope)) due to position energy; a consumption ($C\_5*\kappa*v^3*T$) due to an air resistance; and a consumption ($C\_6*(M+m)/2*v^2*N\_stop$) due to acceleration and deceleration for stopping.

As described above, the link cost calculation section 7 calculates the energy consumption while dividing the energy consumption into energy consuming factors (an energy necessary for something other than traveling, an energy due to friction of a road surface, position energy, and a speed (acceleration and deceleration) energy). This enables calculation of the link cost that accurately reflects the energy consumption in the long distance search link at a time of traveling. Additionally, for the calculation, a modeling is performed by classifying parameter into a parameter concerning a vehicle which should be changed if a vehicle type (for example, characteristics of a power source) changes, and a parameter concerning a road which is not changed irrespective of the vehicle type. As a result, the link cost calculation section 7 can be applied to a wide range of vehicle types including engine vehicles, hybrid vehicles, and electric vehicles.

For example, with respect to an engine vehicle and a hybrid vehicle having an engine, in the mathematical formula shown in FIG. 4, the coefficients $C\_1$ to $C\_6$ concerning the vehicle efficiency can be calculated in consideration of the number of rotations of the engine and the traveling speed. In an engine vehicle having no regeneration mechanism, the coefficient $C\_4$ concerning the vehicle efficiency with respect to downslope position energy is set to be a value close to zero, while in a hybrid vehicle or an electric vehicle having a regeneration mechanism, the coefficient $C\_4$ may be set to be a greater value (that is, the consumption due to the downslope position energy has a negative value) in consideration of a recovery energy caused by regeneration. In addition to the consuming factors shown in FIG. 4, for example, the term of a recovery energy due to the regeneration caused at a time of a downslope or deceleration may be added for the calculation.

In a case where an energy consumption desired to be minimized is different, such as a carbon dioxide emission, a combustion consumption, or a power consumption (that is, in a case where the link cost to be calculated by the link cost calculation section 7 is different), the coefficients $C\_1$ to $C\_6$ concerning the vehicle efficiency may be changed in accordance with the energy consumption to be minimized.

Conventionally (for example, in the Patent Document 1), the energy consumption has been calculated by using the mathematical formula (the basic consumption, the consumption due to friction of a road surface, the consumption due to position energy, and the consumption due to acceleration and deceleration) as shown in FIG. 4. However, this embodiment is different from the conventional, in terms of performing the calculation of the consumption due to the position energy of FIG. 4 with the consumption being divided into the consumption due to upslope elevation differences and the consumption due to downslope elevation differences (conventionally, (for example, in the Patent Document 1), there is no mention to the consumption due to the air resistance, but it is generally known that there is an influence of the consumption due to the air resistance (particularly, in high-speed traveling)).

As described above, in the route search using the high-level road network, the sum of upslope elevation differences and the sum of downslope elevation differences, which are attributes of the long distance search road data 4 of the long distance search link, are used, and thereby the energy consumption due to the position energy that is determined only by elevation differences can be accurately calculated. That is, by using the sum of upslope elevation differences and the sum of downslope elevation differences, the energy consumption can be calculated in consideration of an influence of upslope and downslopes existing in the middle of the long distance search link, which cannot be considered in the difference in height between both ends of the long distance search link that is an aggregation of a plurality of short distance search links.

The link cost calculation section 7 obtains, from the long distance search road data 4 or the short distance search road data 5 of the map data 3, the parameters relating to the attributes of the road, such as the distance, the traveling speed, the elevation difference, the number of stops, and the like, of the link, and also obtains, from the vehicle data 8, the parameters relating to the vehicle characteristics, such as the basic consumption, the friction coefficient, the weight, the efficiency, and the like. Then, based on the attributes and vehicle characteristics thus obtained, the link cost calculation section 7 calculates the energy consumption per one link in accordance with the mathematical formula shown in FIG. 4, as the link cost of a link necessary in the route search processing section 6. In this manner, in the process in the link cost calculation section 7, the calculation can be performed by using a common calculation formula without distinction between the short distance search link and the long distance search link. In this embodiment, the mathematical formula shown in FIG. 4 is described for the calculation of the link cost of the long distance search link. However, it is applicable to the short distance search link, too. That is, based on the attributes of the short distance search link and the vehicle characteristics, the link cost calculation section 7 can also calculate the link cost that is an energy consumption during traveling of the vehicle in the short distance search link. With respect to the short distance search link having the most detailed information, in general, it is assumed that no upslope and downslope exist in the middle of the link and the gradient is constant. Therefore, in the mathematical formula of FIG. 4, either one of the sum of upslope elevation differences and the sum of downslope elevation differences has an effective value.

As for the number of stops mentioned above, the number of traffic lights, stop signs, or the like, may be directly set, or the number of stops in consideration of a stop probability may be set.

In this embodiment, as shown in FIG. 4, as an example, the case is shown in which the energy consumption due to acceleration and deceleration because of stopping at a traffic light or the like is considered. Here, an energy consumption due to acceleration and deceleration because of speed reduction at a curve or the like may be separately considered. For example, when the reduction of the traveling speed is defined as v_delta and the number of accelerations and decelerations is defined as N_slow, it can be calculated as $C\_7*(M+m)/2*v\_delta^2*N$ slow, similarly to the calculation of the energy consumption due to acceleration and deceleration because of stopping.

Figure 5:
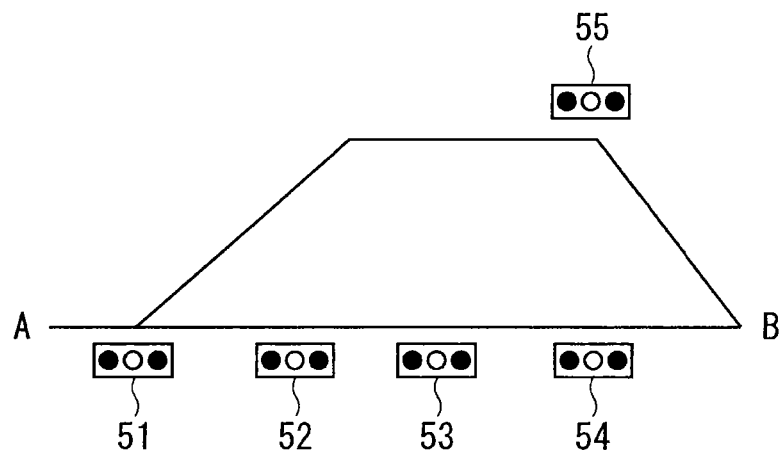
FIG. 5 A conceptual diagram for explaining a route search in consideration of the number of stops at traffic lights according to the embodiment of the present invention.

FIG. 5 is a conceptual diagram for explaining a route search in consideration of the number of stops at traffic lights according to the embodiment of the present invention. FIG. 5 shows, as an example, a case where the number of traffic lights 51 to 55 (or stop signs) or the like is set as the attribute of the road data. It is considered that the energy cost (link cost) of the link is largely changed by stopping at the traffic light or the like. In a situation where no traffic light schedule is given, whether or not stopping occurs at the traffic light is a probabilistic event, and it is necessary to establish a search method in consideration thereof. Here, two routes from a spot A to a spot B will be presented as follows, and thereby a description will be given to an example in which the degree of influence of the traffic light is correctly presented to the user.

Route 1: such a route that the energy cost is the lowest in a case of stopping at all the traffic lights.

Route 2: such a route that the energy cost is the lowest in a case of passing through all the traffic lights without stopping.

The route 1 represents the upper route in FIG. 5, and is the route obtained by performing the search while setting the number of stops in the mathematical formula of FIG. 4 to be the maximum value (for example, the number of all the traffic lights). The route 2 represents the lower route in FIG. 5, and is the route obtained by performing the search while setting the number of stops in the mathematical formula of FIG. 4 to be the minimum (for example, zero). The route 1 and the route 2 thus obtained are presented to the user. That is, the route search device 1 according to this embodiment further includes a number-of-stops estimation section (not shown) for estimating the number of stops in each of a plurality of short distance search links corresponding to one long distance search link. Based on the total number of stops that is the attribute of the long distance search link, the link cost calculation section 7 calculates the link cost in a case where the total number of stops is the maximum and the link cost in a case where the total number of stops is the minimum. The route search processing section 6 calculates such a route that the energy consumption is the lowest in a case where the total number of stops is the maximum and such a route that the energy consumption is the lowest in a case where the total number of stops is the minimum.

With respect to the route 1 and the route 2 obtained as a result of the search, it may be possible that the energy cost of the route 1 is calculated while the number of stops is set to be the minimum, and the energy cost of the route 2 is calculated while the number of stops is set to be the maximum, to thereby present each route with a variation range of the energy cost. In other words, with respect to such a route that the energy consumption is the lowest when the total number of stops calculated by the route search processing section 6 is the maximum, the link cost calculation section 7 calculates the link cost in a case where the total number of stops is the minimum, and with respect to such a route that the energy consumption is the lowest when the total number of stops is the minimum, the link cost calculation section 7 calculates the link cost in a case where the total number of stops is the maximum.

The node cost in a case of stopping may be determined based on the gradients of an enter link and an exit link. For example, a time when the traffic light is a red signal may be learned and reflected to the node cost in a case of stopping. With respect to such a route that the travel distance is the shortest or such a route that the traveling time is the shortest instead of such a route that the energy consumption is the lowest, the link cost may be calculated with the number of stops described above being added thereto.

In addition to the sum of upslope elevation differences and the sum of downslope elevation differences, the sum of link distances corresponding to the sum of upslope elevation differences (that is, the sum of distances of upslope links) and the sum of link distances corresponding to the sum of downslope elevation differences (that is, the sum of distances of downslope links) may be set as the attributes of the road data. Such setting enables the link cost to be calculated in consideration of a difference in the vehicle efficiency depending not only on the influence of the position energy but also on the gradient.

A parameter (specifically, the number of gradient changing points and the like) having an influence on the energy cost, such as the continuity of the sections (the short distance search links corresponding to the long distance search link) in the long distance search link (that is, a link in which upslope sections and downslope sections are continuous in an alternating manner, or a link in which upslope sections continuous with one another are located together and downslope sections continuous with one another are located together), may be set as the attribute of the road data.

In this embodiment, the typical energy consumption such as the position energy is focused on, and the description has been given to a case where, for example, the sum of upslope elevation differences and the sum of downslope elevation differences of the short distance search links which are the attributes of the short distance search links (that is, an aggregation of the attributes of the short distance search links) are set as the attributes of the long distance search link. Here, in a case of more detailed calculation of the link cost, the attributes of the short distance search links may be directly set as the attributes of the long distance search link, instead of aggregating the attributes of the short distance search links. For example, in the calculation of the link cost of the long distance search link, in a case of considering an elevation difference of each of p short distance search links, all of p elevation differences may be set as the attributes of the long distance search link. However, in a case where an aggregation of short distance search links, such as the sum of upslope elevation differences and the sum of downslope elevation differences of the short distance search links as described above, as compared with a case where all the attributes of the short distance search links are set as the attributes of the long distance search link, the data size of the map data 3 can be reduced (for example, reduced from the size corresponding to p to the size corresponding to two), and additionally the number of attributes of the long distance search link to be stored in the map data 3 is fixed. Therefore, as compared with a case where the number of attributes to be stored in the map data 3 is variable (the number of attributes changes depending on the number of short distance search links), the data can be read without consideration of the number of attributes, and thus the amount of calculation required for obtaining data can be generally reduced.

In this embodiment, an example has been shown in which the sum of upslope elevation differences and the sum of downslope elevation differences are set as the attributes of the long distance search link. The three value of "the sum of upslope elevation differences", "the sum of downslope elevation differences", and "the elevation difference between the start and end points of the link" satisfy a relationship of "the sum of upslope elevation differences"+"the sum of downslope elevation differences"="the elevation difference between the start and end points of the link". Accordingly, in order to obtain the same effects as those of this embodiment, information of any two of "the sum of upslope elevation differences", "the sum of downslope elevation differences", and "the elevation difference between the start and end points of the link" is set as the attributes of the long distance search link. For example, two information of "the sum of upslope elevation differences" and "the elevation difference between the start and end points of the link" may be set as the attributes of the long distance search link.

In this embodiment, a case where the gradient in the long distance search link is not necessarily constant has been described as an example. However, with respect to the short distance search link in which the gradient is not constant, too, the sum of upslope elevation differences and the sum of downslope elevation differences are set as the attributes of the short distance search link, and thereby the energy consumption due to the position energy during traveling can be accurately obtained while suppressing the number of link (the amount of road data) without dividing the link at the gradient changing point existing in the middle of the link.

The map data 3 stores the parameters relating to the road, such as the elevation difference and the number of stops. At a time of the route search process performed by the route search processing section 6, necessary link cost is appropriately (for example, online) calculated by the link cost calculation section 7. This enables flexible change of an algorithm for calculating the link cost and the parameters, such as the vehicle characteristics, that influences the energy cost, without a change of an offline calculation result (map data). Additionally, in a case where traffic information or the like is obtained, the parameters such as the traveling speed and the traveling time in the link can be flexibly changed. For example, in a case where the link is trafficy, the parameter relating to the traveling speed may be set lower while the parameter relating to the traveling time is set higher.

For example, in a case of a hybrid vehicle or an electric vehicle that can recover regeneration energy particularly in a downslope, the sum of upslope elevation differences and the sum of downslope elevation differences in the mathematical formula for calculating the link cost shown in FIG. 4 are discriminated from each other. Thereby, depending on a difference in the energy efficiency between the upslope and the downslope, $C\_3$ and $C\_4$ that are the parameters relating to the vehicle are set in accordance with the vehicle characteristics. Thus, the link cost reflecting a more accurate energy cost can be set. Moreover, as for an influence of regeneration at a time of deceleration caused by stopping at a traffic light or the like and an influence of an idling stop, the parameters relating to the traveling time, such as T and $C\_6$, are set in accordance with the vehicle characteristics, and thereby the link cost reflecting a more accurate energy cost can be set. For example, in a case of such a vehicle that 30% of a speed energy caused by acceleration is recoverable, the value of $C\_6$ may be set to be a value that is lower by 30%.

Moreover, physical parameters (the distance, the traveling time, the elevation difference, and the number of stops) specific to the road and physical parameters (the vehicle weight and the energy efficiency) specific to the vehicle characteristics are discriminated from each other, and used (stored). Thus, as compared with storing them collectively as the attributes of the road data in the map data 3, the amount of data to be updated when the map is updated can be reduced, because only the physical parameter relating to the road that has been changed upon update.

It is necessary that the high-level road network satisfies a general condition that "the link cost of the long distance search link is surely equal to the sum of link costs of the corresponding short distance search links". This condition is condition necessary for ensuring that a search result obtained by using the high-level road network is coincident with a search result obtained by using the low-level road network. If a route search result in the high-level road network is different from a route search result in the low-level road network, the optimality of a search result obtained by using the high-level road network cannot be guaranteed. In this embodiment, the sum of upslope elevation differences and the sum of downslope elevation differences of the short distance search links are set as the attribute concerning the elevation difference of the long distance search link, and the sum of values of attributes other than the elevation difference of the short distance search link is set as the attribute of the long distance search link. At a time of performing the route search process, the link cost is calculated by using a mathematical formula (for example, the mathematical formula shown in FIG. 4) common to the short distance search link and the long distance search link. Therefore, the above-described condition can be satisfied.

The above-described condition will be described by taking as an example a case where the energy consumption per one link shown in FIG. 4 is the link cost. A link cost concerning a long distance search link including an aggregation of n short distance search links is indicated by the following formula (1). Here, $T\_i$, $D\_i$, $H\_up\_i$, $H\_down\_i$, and $N\_stop\_i$ represent the traveling time, the link distance, the sum of upslope elevation differences, the sum of downslope elevation differences, and the number of stops, respectively, in the i-th short distance search link.

[Math. 1]

$$\sum_{i=1}^{n}\left(C_1 q_{idle} T_i + C_2 \mu M g D_i + C_3 M g H_{upi} + \right.$$
$$\left. C_4 M g H_{downi} + C_5 \kappa v^3 T_i + C_6 (M+m)\frac{1}{2}v^2 N_{stopi}\right) \quad (1)$$

In the formula (1), assuming the variables (such as the traveling speed v) other than the variables with the subscript i are constants, the following formula (2) can be shown.

[Math. 2]

$$C_1 q_{idle} \sum_{i=1}^{n} T_i + C_2 \mu M g \sum_{i=1}^{n} D_i + C_3 M g \sum_{i=1}^{n} H_{upi} +$$
$$C_4 M g \sum_{i=1}^{n} H_{downi} + C_5 \kappa v^3 \sum_{i=1}^{n} T_i + C_6(M+m)\frac{1}{2}v^2 \sum_{i=1}^{n} N_{stopi} \quad (2)$$

In the formula (2), the sum of T_i, the sum of D_i, the sum of H_up_i, the sum of H_down_i, and the sum of N_stop_i are values to be set as the attributes of the long distance search link. Accordingly, if the link cost of the long distance search link is calculated by using the sums of the traveling times, the link distances, the upslope elevation differences, the downslope elevation differences, and the number of stops of the short distance search link which are set as the attributes of the long distance search link, it can be ensured that the link cost of the long distance search link is coincident with the sum of the link costs of the short distance search links corresponding to this long distance search link.

In a case where the flexibility in changing the algorithm for calculating the link cost and the vehicle characteristics parameter that influences the energy cost is not important, it may be possible that the link cost is preliminarily calculated and stored as the attribute of the road data at a time of offline preparation of the map data.

Not only in a case of performing a route search for such a route that the energy cost (link cost) is the lowest, but also in a case of calculating the energy consumption of each route with respect to the search result (a group of passing nodes (links)) obtained by the route search, the calculation can be performed at a high speed by using the attribute of the road data in the high-level road network. That is, when the route search is performed by using the high-level road network, if the search result thus calculated includes the node and the link of the high-level road network, the attribute of the road data in the high-level road network is used to obtain the energy consumption per link, which is then summed up over the entire route. Thereby, as compared with calculating the link cost by using only the road data in the low-level road network, the number of links necessary for the calculation is reduced (not only a simple calculation time but also the number of accesses to the map data is reduced), and therefore the calculation of the energy consumption of each route can be performed at a high speed.

Figure 6:
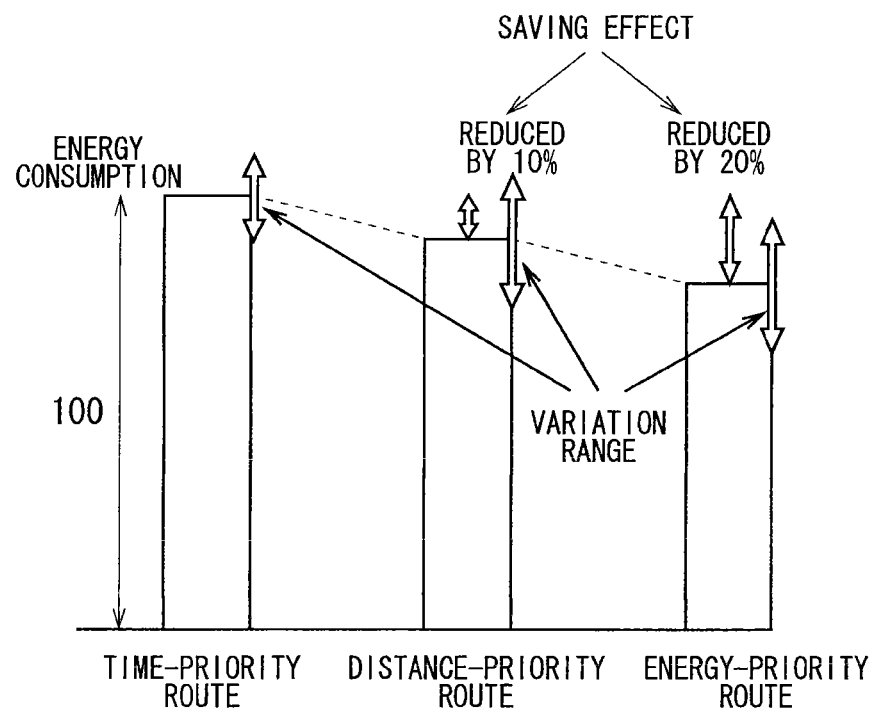
FIG. 6 A diagram showing an example of presentation, to a user, of an energy saving effect and a variation range thereof by using an energy consumption index according to the embodiment of the present invention.

FIG. 6 is a diagram showing an example of presentation, to a user, of an energy saving effect and a variation range thereof by using an energy consumption index according to the embodiment of the present invention. As shown in FIG. 6, the energy consumption is calculated with respect to each of the routes obtained by the route search with priority to time and the route search with priority to distance. This enables calculation of the rate of improvement in the energy consumption (the rate of improvement as compared with the energy consumption of the route obtained by another route search), which indicates how the energy consumption of the route with the lowest energy cost is improved as compared with another route (for example, a time-priority route or a distance-priority route as shown in FIG. 6). The rate of improvement thus calculated is presented to the user in the form of, for example, a bar graph serving as the energy consumption index of the percentage of energy consumption as standardized by the energy consumption of the route with the highest energy consumption. This can enhance the environmental awareness of the user, to allow the user to select a route with a lower energy consumption.

For example, in FIG. 6, the presentation that facilitates visual check by the user is made, in which the energy consumption index of the route (time-priority route) with the highest energy consumption is 100, the energy consumption index of the route (distance-priority route) with the energy consumption lower by 10% than that of the time-priority route is 90, and the energy consumption index of the route (energy-priority route) with the energy consumption lower by 20% than that of the time-priority route is 80.

With respect to the energy consumption index of each route, as shown in FIG. 6, a variation range in consideration of an influence of an uncertain factor, such as stopping at the traffic light mentioned above, may be indicated above the graph. This enables the user to comprehensively select the route in a state where the variation range (risk) is added in advance.

From the above, in the route search using the high-level road network, the search can be performed in consideration of a factor, such as the gradient in the link, that influences the energy cost, and even though the distance between the start and end points is long, a route with the lowest energy cost can be searched for at a high speed.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS 1 route search device; 2 long distance search attribute calculation section; 3 map data; 4 long distance search road data; 5 short distance search road data; 6 route search processing section; 7 link cost calculation section; 8 vehicle data; 31 to 34 short distance search link; 35 long distance search link; 51 to 55 traffic light.

The invention claimed is:
1. A route search device for searching for a route that connects a start point to an end point, said route search device comprising:
   a nontransitory computer-readable storage medium having stored thereon short distance search road data that contains at least one short distance search link for use in a short distance search and long distance search road data that contains at least one long distance search link for use in a long distance search; and
   circuitry configured to:
      calculate, as an attribute of the at least one long distance search link, the sum of upslope elevation differences of a plurality of short distance search links and the sum of downslope elevation differences of said plu- rality of short distance search links corresponding to said at least one long distance search link;
calculate a link cost that is an energy consumption at a time when a vehicle travels in said at least one long distance search link, based on said attribute of said at least one long distance search link and vehicle characteristics;
calculate, based on said link cost, such a route that the energy consumption is the lowest, or the energy consumption in a predetermined route; and
calculate, as said link cost, a basic consumption other than a consumption necessary for traveling, a consumption due to friction of a road surface, a consumption due to position energy, a consumption due to an air resistance, and a consumption due to acceleration and deceleration.

2. The route search device according to claim 1, wherein said attribute of said at least one long distance search link is held in said long distance search road data.

3. The route search device according to claim 1, wherein said predetermined route is either one of such a route that a travel distance of said route is the shortest and such a route that a traveling time of said route is the shortest.

4. The route search device according to claim 1, wherein the circuitry is further configured to calculate, as said link cost, a carbon dioxide emission, a fuel consumption, or a power consumption.

5. The route search device according to claim 1, wherein the circuitry is further configured to calculate a link cost that is an energy consumption at a time when a vehicle travels in said short distance search link, based on an attribute of said short distance search link and said vehicle characteristics.

6. The route search device according to claim 1, wherein the circuitry is further configured to:
calculate, as an attribute of the at least one long distance search link, the sum of traveling times, the sum of distances, said sum of upslope elevation differences, said sum of downslope elevation differences, and the total number of stops, of the plurality of short distance search links corresponding to said at least one long distance search link, and
calculate said link cost based on said attribute of said at least one long distance search link and said vehicle characteristics.

7. The route search device according to claim 1, wherein the circuitry is further configured to:
calculate an estimation of the number of stops in each of the plurality of short distance search links corresponding to the at least one long distance search link,
calculate said link cost in a case where said total number of stops is the maximum and said link cost in a case where said total number of stops is the minimum, based on said total number of stops that is an attribute of said long distance search link, and
calculate such a route that said energy consumption is the lowest when said total number of stops is the maximum and such a route that said energy consumption is the lowest when said total number of stops is the minimum.

8. The route search device according to claim 7, wherein with respect the calculated route such that said energy consumption is the lowest when said total number of stops is the maximum, the circuitry is further configured to calculate said link cost in a case where said total number of stops is the minimum, and
with respect to the calculated route such that said energy consumption is the lowest when said total number of stops is the minimum, the circuitry is further configured to calculate said link cost in a case where said total number of stops is the maximum.

9. The route search device according to claim 7, wherein, instead of calculating the route such that said energy consumption is the lowest, the circuitry is configured to calculate the energy consumption in the predetermined route,
wherein the predetermined route is either one of such a route that a travel distance of said route is the shortest or such a route that a traveling time of said route is the shortest.

10. The route search device according to claim 3, wherein the circuitry is further configured to calculate said energy consumption of each of a plurality of routes and output a comparison among said energy consumptions of the respective routes, said plurality of routes including such a route that said energy consumption is the lowest, such a route that a travel distance of said route is the shortest, and such a route that a traveling time of said route is the shortest.

11. The route search device according to claim 1, wherein said circuitry is provided in a map generation system or a car navigation system.

12. A route search device for searching for a route that connects a start point to an end point, said route search device comprising:
a nontransitory computer-readable storage medium having stored thereon short distance search road data that contains at least one short distance search link for use in a short distance search and long distance search road data that contains at least one long distance search link for use in a long distance search; and
circuitry configured to:
calculate a link cost that is an energy consumption at a time when a vehicle travels in said at least one long distance search link, based on an attribute of said at least one long distance search link and vehicle characteristics;
calculate, based on said link cost, such a route that the energy consumption is the lowest, or the energy consumption in a predetermined route; and
calculate, as said link cost, a basic consumption other than a consumption necessary for traveling, a consumption due to friction of a road surface, a consumption due to position energy, a consumption due to an air resistance, and a consumption due to acceleration and deceleration,
wherein said long distance search road data stored on the nontransitory computer-readable storage medium includes, as an attribute thereof, the sum of upslope elevation differences and the sum of downslope elevation differences of a plurality of short distance search links corresponding to said at least one long distance search link.

* * * * *